US008217543B2

(12) United States Patent
Ishida et al.

(10) Patent No.: US 8,217,543 B2
(45) Date of Patent: Jul. 10, 2012

(54) ELECTROMAGNETIC CLUTCH

(75) Inventors: Toshihiko Ishida, Niwa-gun (JP);
 Tsutomu Takeuchi, Gamagori-shi (JP);
 Naoya Oku, Nagoya (JP)

(73) Assignee: Aisin Seiki Kabushiki Kaisha,
 Kariya-Shi, Aichi (JP)

( * ) Notice: Subject to any disclaimer, the term of this patent is extended or adjusted under 35 U.S.C. 154(b) by 330 days.

(21) Appl. No.: 12/671,852

(22) PCT Filed: Oct. 15, 2008

(86) PCT No.: PCT/JP2008/068660
 § 371 (c)(1),
 (2), (4) Date: Feb. 2, 2010

(87) PCT Pub. No.: WO2009/063717
 PCT Pub. Date: May 22, 2009

(65) Prior Publication Data
 US 2011/0227436 A1 Sep. 22, 2011

(30) Foreign Application Priority Data

Nov. 15, 2007 (JP) ................................. 2007-296923
Nov. 15, 2007 (JP) ................................. 2007-296924

(51) Int. Cl.
 *H02K 7/10* (2006.01)
(52) U.S. Cl. ........................................................ 310/78
(58) Field of Classification Search .................... 310/78, 310/75 R, 67 R, 71
 See application file for complete search history.

(56) References Cited

U.S. PATENT DOCUMENTS 6,390,264 B2 * 5/2002 Torii et al. ....................... 192/38
6,397,523 B1 6/2002 Fukumoto et al.
7,025,187 B2 4/2006 Hammond et al.
(Continued)

FOREIGN PATENT DOCUMENTS

JP 51-1383 A 1/1976
(Continued)

OTHER PUBLICATIONS

English translation of International Preliminary Report on Patentability issued on Jun. 29, 2010 by The International Bureau of WIPO in International Application No. PCT/JP2008/068660.

(Continued)

*Primary Examiner* — Nguyen N Hanh
(74) *Attorney, Agent, or Firm* — Buchanan Ingersoll & Rooney PC

(57) ABSTRACT

An electromagnetic clutch includes a motor, a worm wheel rotatably driven by a motor, a rotor having an electromagnetic coil and rotatable about a same rotational axis as the worm wheel, an armature that is mounted to the worm wheel and is pulled into contact with the rotor upon application of electric power to the electromagnetic coil, so that the armature is rotated with the rotor, a cover member configured to cover the rotor and the armature, and a power supply mechanism disposed between the cover member and the rotor and connected to a power source for supplying power to the electromagnetic coil. The power supply mechanism includes a fixed frame body having a first power supply portion for receiving the power from the power source and fixed to the cover member, a rotary frame body having a second power supply portion in contact with the first power supply portion for supplying the power to the electromagnetic coil, the rotary frame body being fixed to the rotor and rotatably engaged with the fixed frame body; and a plate-like conducting member provided in the cover member, the conducting member coming into contact with a portion of the first power supply portion projecting from the fixed frame body.

12 Claims, 8 Drawing Sheets

U.S. PATENT DOCUMENTS

| | | |
|---|---|---|
| 7,140,150 B2 | 11/2006 | Sakai et al. |
| 2007/0103013 A1* | 5/2007 | Sakohira et al. ............... 310/71 |
| 2008/0110717 A1 | 5/2008 | Toyama et al. |
| 2011/0036678 A1 | 2/2011 | Hashizume et al. |

FOREIGN PATENT DOCUMENTS

| | | | |
|---|---|---|---|
| JP | 53-32191 A | 8/1978 | |
| JP | 57-24328 U | 2/1982 | |
| JP | 63-173528 U | 11/1988 | |
| JP | 5-71463 U | 9/1993 | |
| JP | 11-141571 A | 5/1999 | |
| JP | 2000-230579 A | 8/2000 | |
| JP | 2001-314060 A | 11/2001 | |
| JP | 2004-212158 A | 7/2004 | |
| JP | 2004-324171 A | 11/2004 | |
| JP | 2005-248583 A | 9/2005 | |
| JP | 2006-9938 A | 1/2006 | |
| JP | 2006-125452 A | 5/2006 | |
| JP | 2007-135367 A | 5/2007 | |
| JP | 2007-139028 A | 6/2007 | |

OTHER PUBLICATIONS

International Search Report (PCT/ISA/) issued on Dec. 2, 2008 by the Japanese Patent Office acting as the International Searching Authority in International Application No. PCT/JP2008/068660.

Written Opinion (PCT/ISA/237) issued on Dec. 2, 2008 by the Japanese Patent Office acting as the International Searching Authority in International Application No. PCT/JP2008/068660.

U.S. Appl. No. 12/671,869, filed Feb. 2, 2012.

Japanese Office Action issued Mar. 8, 2012 by the Japanese Patent Office in Japanese Patent Application No. 2007-296924 and partial English translation thereof.

* cited by examiner

[Fig.1]
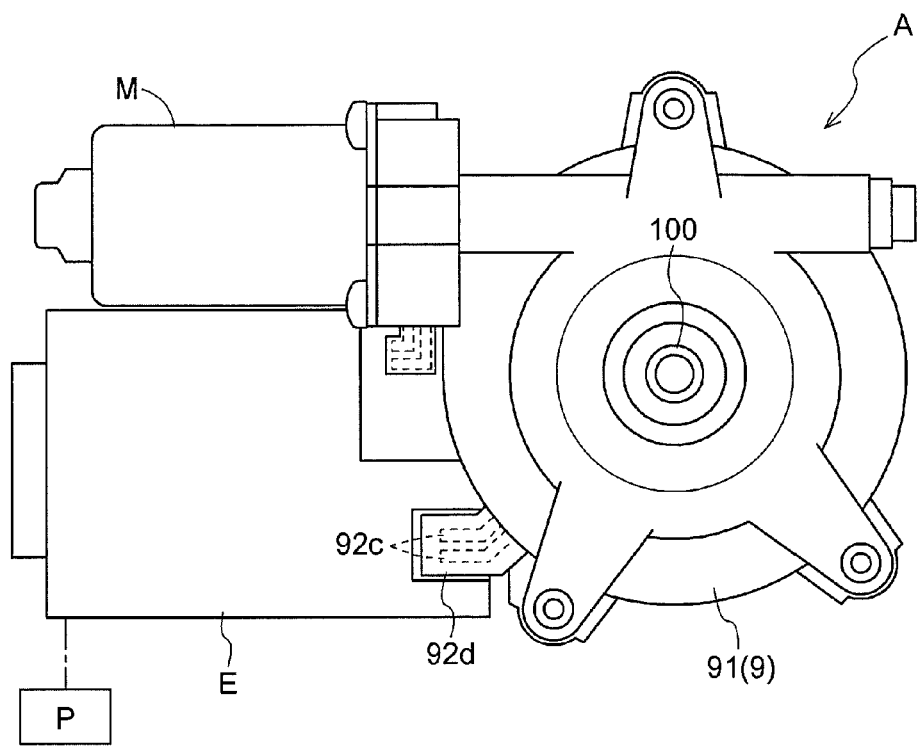
[Fig.2]
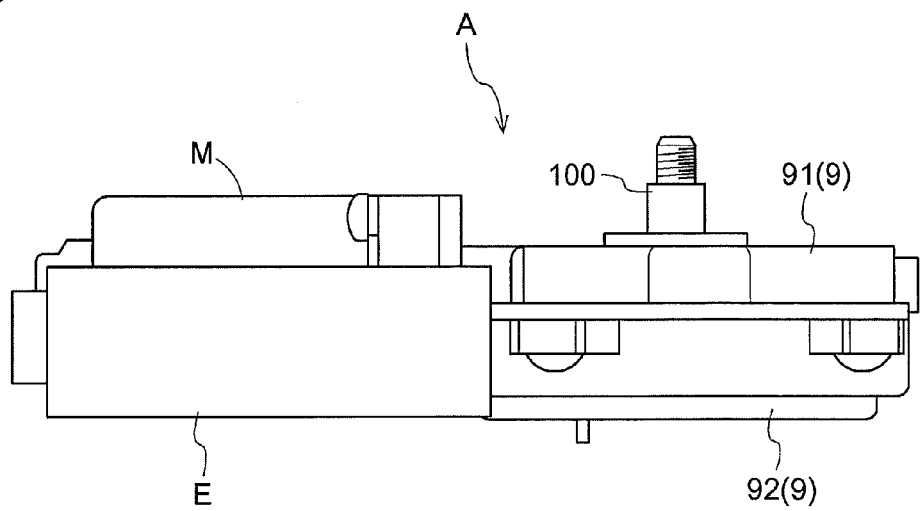

[Fig.3]
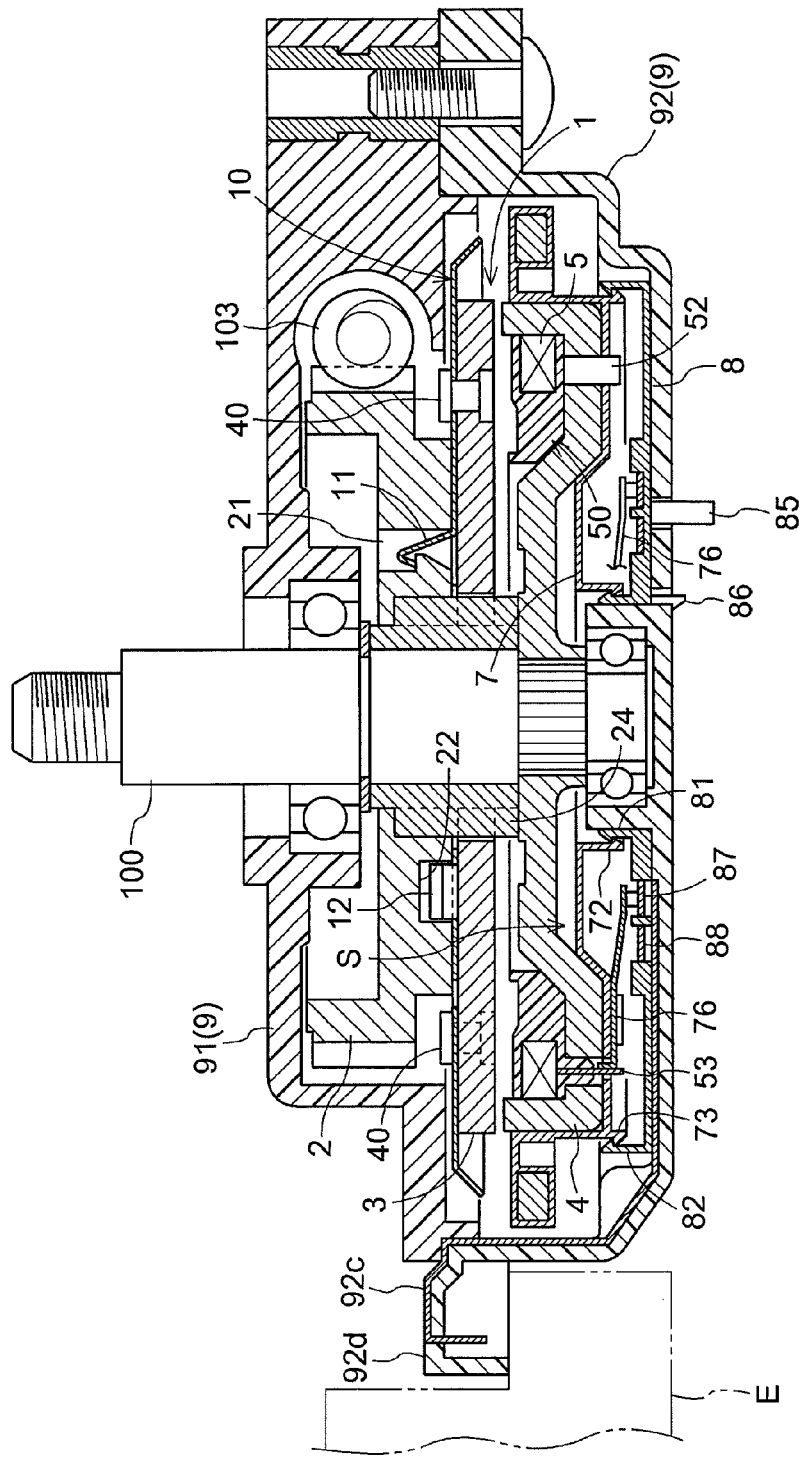

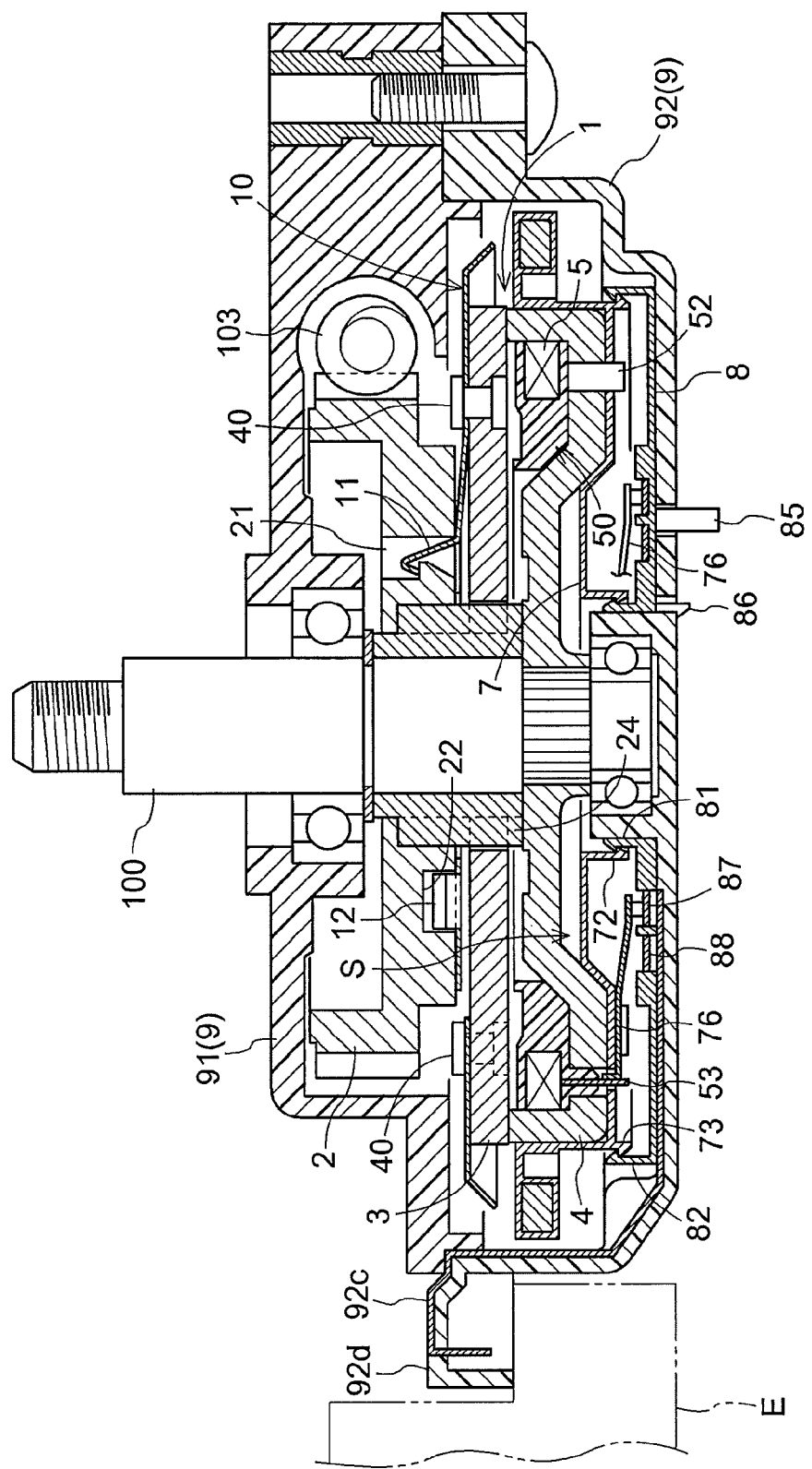
[Fig.4]

[Fig.5]
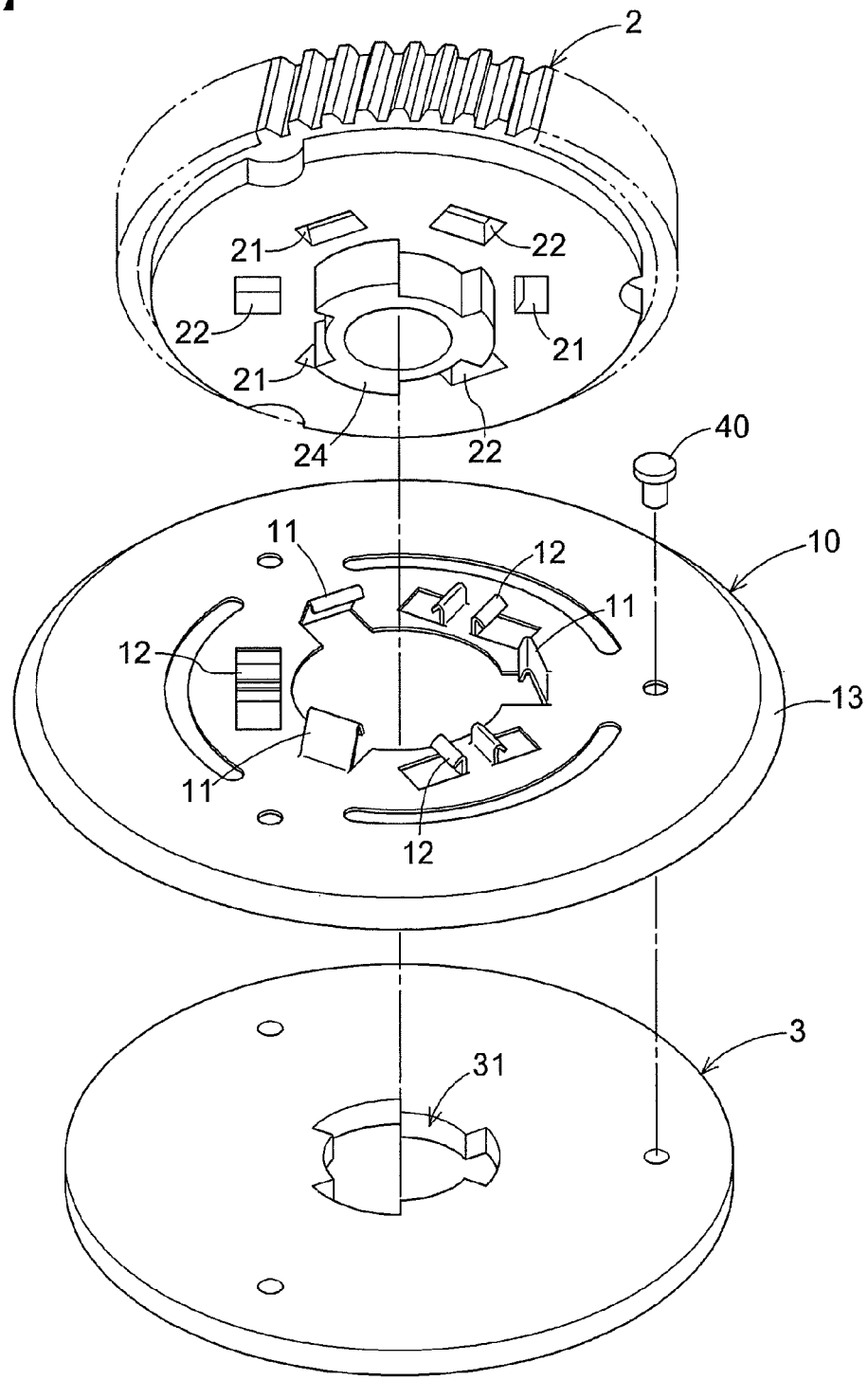

[Fig.6]
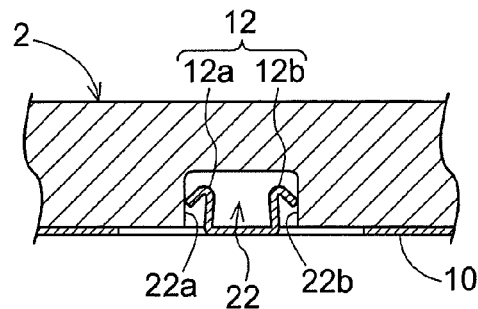
[Fig.7]
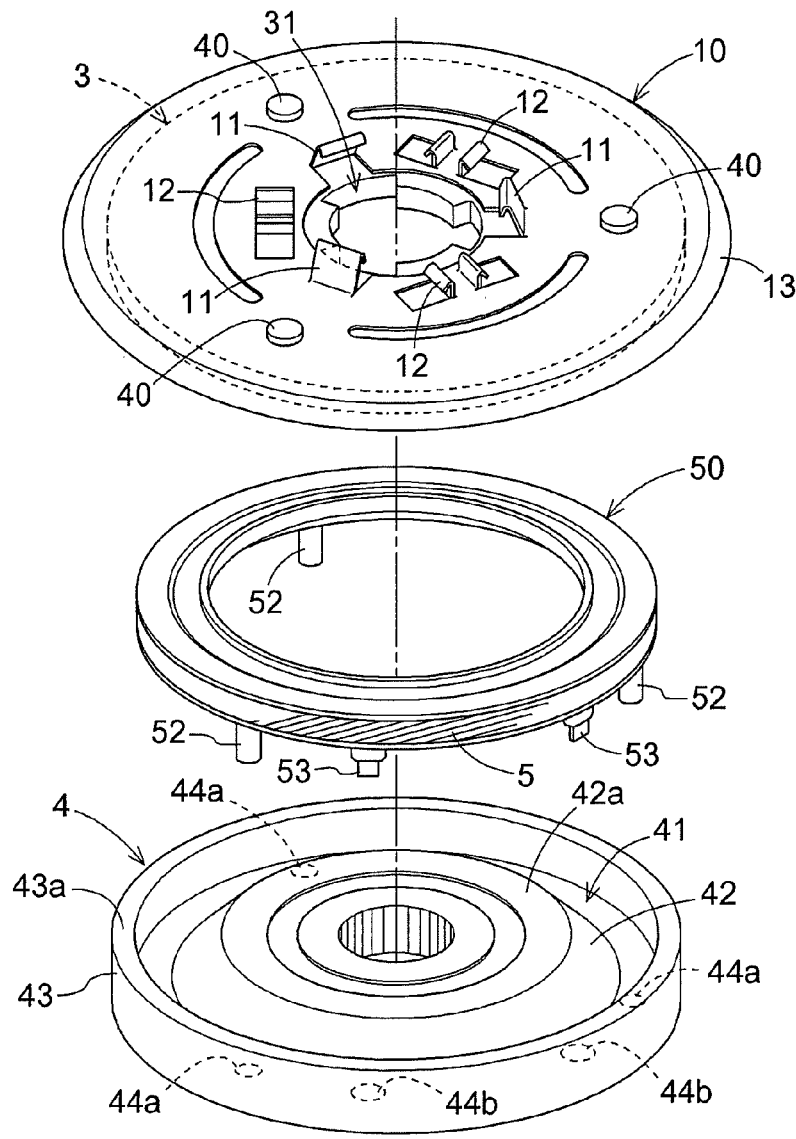

[Fig.8]
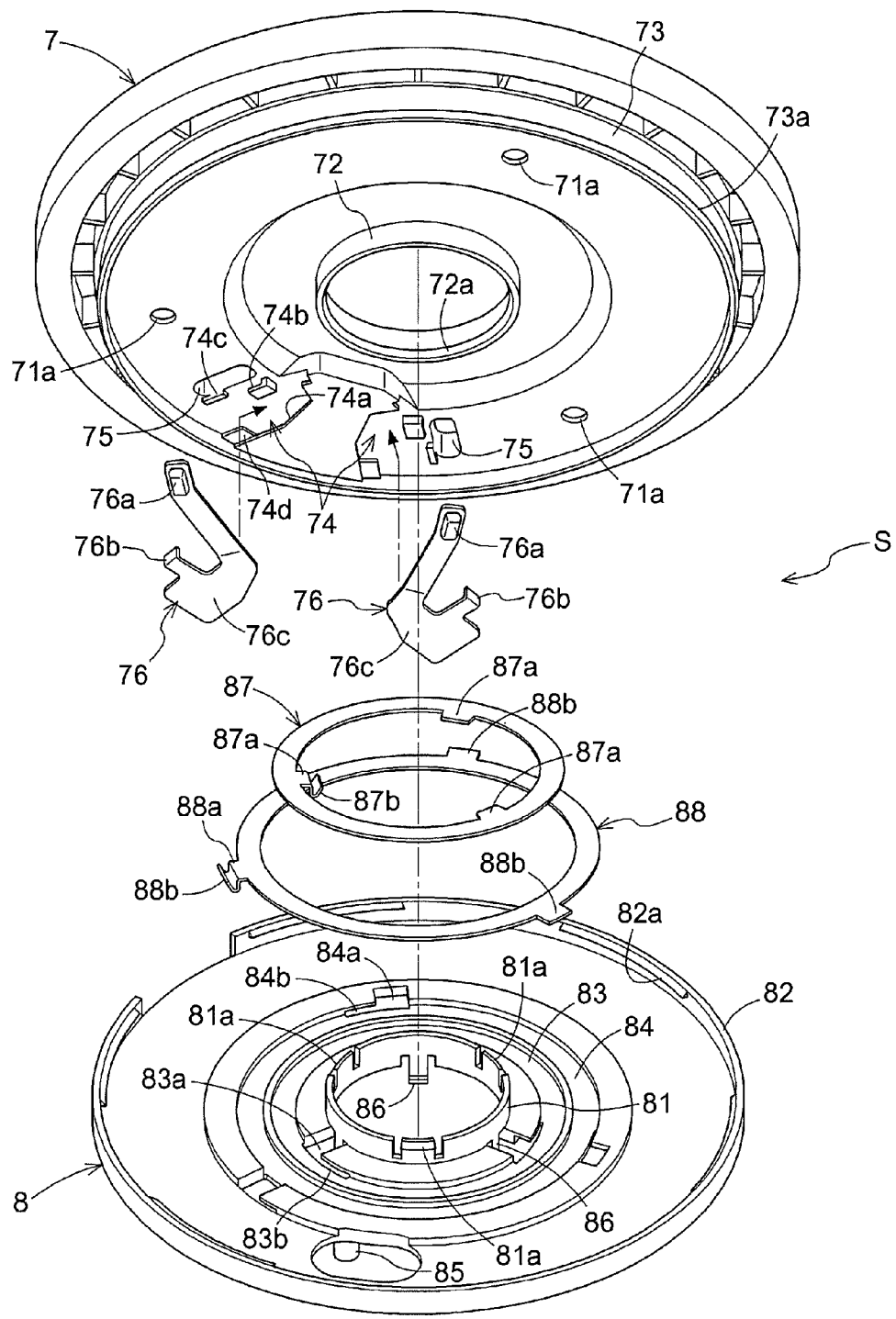

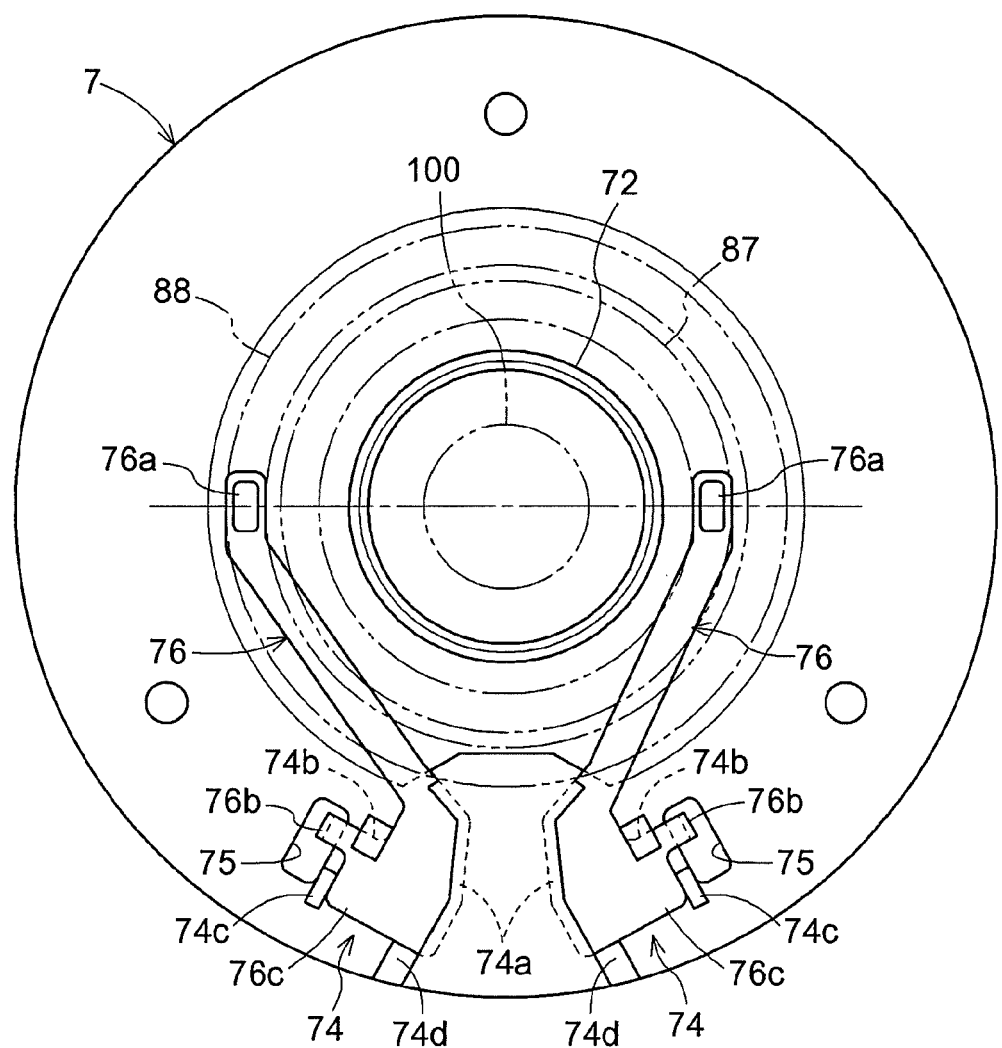
[Fig.9]

[Fig.10]
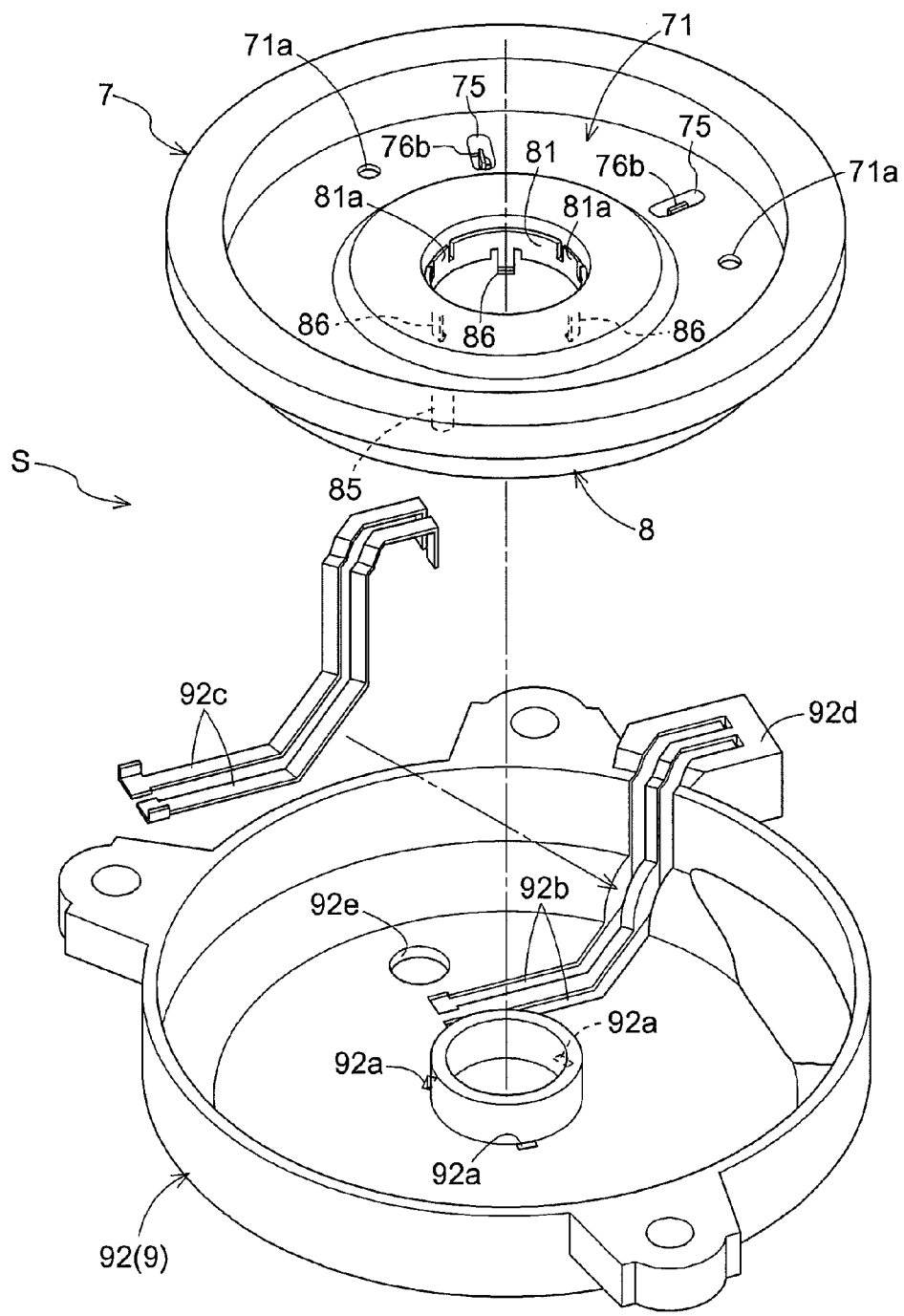

ELECTROMAGNETIC CLUTCH

TECHNICAL FIELD

The present invention relates to an electromagnetic clutch including a worm wheel rotatably driven by a motor, a rotor having an electromagnetic coil, and an armature that is mounted to the worm wheel side and is pulled into contact with the rotor upon application of electric power to the electromagnetic coil, so that the armature is rotated with the rotor.

BACKGROUND ART

As an electromagnetic clutch for use in an opening/closing apparatus for a vehicle door, there is known e.g. one having a worm gear, a worm wheel, an armature, a plate spring, a rotor, an electromagnetic coil, etc (see e.g. Patent Document 1).

With such electromagnetic clutch, at the time of non-powered state with no application of electric power to the electromagnetic coil, the armature and the rotor are either spaced apart from each other or in light contact with each other, so as to alleviate a force needed for a manual operation of the vehicle door. At the time of powered state with application of the electric power to the electromagnetic coil, the electromagnetic coil generates a magnetic force, which pulls the armature toward the rotor, so that the armature eventually comes into firm contact with the rotor. Under this condition, automatic opening/closing operations by motor drive become possible.

Further, with the electromagnetic clutch disclosed in Patent Document 1, a plate spring member is incorporated between the worm wheel and the armature. Fixing operations of the worm wheel, the plate spring member and the armature are done by mutual caulking via pins or fastening of screws. With this electromagnetic clutch, when no power is supplied to the electromagnetic coil, the plate spring member, with its resilient force, pulls the armature toward the worm wheel. As a result, there is formed a gap between the armature and the rotor, so that the electromagnetic clutch assumes a disengaged state. This is a condition of absence of direct coupling between the vehicle door and the motor. Accordingly, when the vehicle door is to be opened/closed by a manual operation, this manual operation can be done lightly. On the other hand, when power is supplied to the electromagnetic coil, the magnetic force generated from the electromagnetic coil pulls the armature into contact with the rotor, so that the electromagnetic clutch becomes engaged. Therefore, if the motor is driven under this condition, its drive force is transmitted to the opening/closing mechanism of the vehicle door, via the worm gear, the worm wheel, the plate spring member, the armature and the rotor. Hence, automatic opening/closing operation of the vehicle door becomes possible.

There is also known an opening/closing apparatus for a vehicle door having an electromagnetic clutch that uses a wave washer (a resilient member) between the worm wheel and the armature, instead of the plate spring member (see, e.g. Patent Document 2).

With the electromagnetic clutch used in the vehicle door opening/closing apparatus disclosed in Patent Document 2, a retaining portion of the armature is engaged with a cutout formed in the worm wheel. In the case of this electromagnetic clutch, the armature is movable relative to the worm wheel in a rotational axis direction. When the electromagnetic clutch is under the non-powered state, in order to prevent noise generation due to vibration, the wave washer interposed between the worm wheel and the armature presses the armature against the rotor. When the electromagnetic clutch enters the powered state, due to the magnetic force, the force pulls the armature toward the rotor, so the armature comes into firm contact with the rotor. That is to say, in the case of the vehicle door driving apparatus disclosed in Patent Document 2, the armature is always in contact with the rotor, whether the electromagnetic clutch is under the powered state or the non-powered state. In this, however, when the electromagnetic clutch is under the non-powered state, the contact force from the armature against the rotor is not so strong. So, when the opening/closing operation of the vehicle door is effected manually, this will cause the armature to slide and rotate relative to the rotor.

Further, in the case of such electromagnetic clutch disclosed in Patent Document 1 or the like, power supply to the electromagnetic coil is done conventionally by a power supply unit connected to a power source such as a battery via a lead wire (see e.g. Patent Document 3).

The power supply unit used in Patent Document 3 has an arrangement that a brush holder having a brush is rotatably mounted to a ring holder having a slip spring. And, power connection to this power supply unit is done by connecting a tab formed at a part of the slip spring to the lead wire extended from a battery disposed outside.

As another power supply unit, there is known a power supply unit configured to supply power to the electromagnetic clutch for a vehicle door opening/closing device with the electromagnetic clutch being fixed inside the worm wheel (see e.g. Patent Document 4).

With the power supply unit used in the vehicle door opening/closing apparatus disclosed in Patent Document 4, for the power supply, in the electromagnetic clutch in which a coil bobbin with an electromagnetic coil wound thereabout is incorporated within the worm wheel, a contact plate connected to the power source is connected, through a through hole defined in the worm wheel, to a connecting terminal of the coil bobbin. Further as shown in FIG. 3 or FIG. 5 of this document, the power supply unit has an arrangement of a slip ring being disposed immediately adjacent the worm wheel.

Incidentally, in the manufacture of an electromagnetic clutch for use in a vehicle door opening/closing apparatus or the like, there is a need for facilitating its assembly through reduction in the number of constituting parts and/or manufacturing steps, for the sake of desirable weight reduction and cost reduction.

In the above respect, with the electromagnetic clutch disclosed in Patent Document 1, this requires mutual fixing operations of the worm wheel, the plate spring and the armature by caulking, screw/bolt fastening, etc. Hence, this requires a great number of caulking pins, screws, etc. And, its assembly requires a tool(s). Moreover, in correspondence with the use of caulking pins, screws, etc., the number of parts constituting the electromagnetic clutch and the number of its manufacturing steps too will increase. For these reasons, the electromagnetic clutch disclosed in Patent Document 1 requires significant time and labor for its manufacture and high manufacture costs also.

In the case of the electromagnetic clutch for use in a vehicle door opening/closing apparatus disclosed in Patent Document 2, the worm wheel and the armature are engaged via the wave washer interposed therebetween. Therefore, unlike the electromagnetic clutch of Patent Document 1, this clutch does not require such parts as caulking pins, screws or the like for its assembly. However, since this electromagnetic clutch uses the simple fixing arrangement relying on the engagement of the retaining portion of the armature in the cutout defined in the worm wheel, there is formed a significant amount of looseness (play amount) between the worm wheel and the armature. For this reason, transmission delay tends to occur in the transmission of drive force between the worm wheel and the armature, which in turn may lead to a trouble at the time of opening/closing of the vehicle door, depending on the control condition. For instance, in detection of a foreign object jam, this detection takes a long time.

Further, with this electromagnetic clutch, the armature is constantly in contact with the rotor regardless of the powered/non-powered state of the electromagnetic clutch. Hence, when the vehicle door is opened/closed manually, a noise tends to be generated due to friction between the armature and the rotor. This is another drawback of the above electromagnetic clutch.

Further, in the case of the power supply unit disclosed in Patent Document 3, the lead wire extended from the external battery is connected to the power supply unit. Therefore, this construction requires a space for laying out the lead wire. And, this laying-out operation of the lead wire needs to be taken into consideration when the connection is made. For these reasons, the assembly of the electromagnetic clutch tends to be complicated and requiring greater numbers of parts and manufacturing steps. As a result, the final product tends to occupy a large space for its mounting and higher manufacture costs as well.

In the case also of the power supply unit used in the vehicle door opening/closing apparatus disclosed in Patent Document 4, as understood from its FIG. 5, a lead wire from an external battery is connected to the power supply unit. For this reason, this suffers the same drawback as the power supply unit disclosed in Patent Document 2.

Moreover, with this power supply unit, the slip ring is disposed immediately adjacent the worm wheel. Therefore, a foreign object or material such as an amount of grease applied to the worm wheel tends to adhere to the slip ring, thus tending to invite a conduction trouble such as short circuiting.

The present invention has been made in view of the above-described states of the art and its one object is to provide an electromagnetic clutch which requires fewer numbers of parts and manufacturing steps and which also can be assembled easily.

A further object of the present invention is to prevent delay in the transmission of drive force between the worm wheel and the armature and to realize superior quietness at the time of vehicle door operation.

Patent Document 1: Japanese Utility Model Application "Kokai" No. 5-71463
Patent Document 2: Japanese Patent Application "Kokai" No. 2004-324171
Patent Document 3: Japanese Patent Application "Kokai" No. 2007-135367
Patent Document 4: Japanese Patent Application "Kokai" No. 2005-248583

DISCLOSURE OF THE INVENTION

According to the characterizing feature of the electromagnetic clutch relating to the present invention, the electromagnetic clutch comprises:
a motor;
a worm wheel rotatably driven by a motor;
a rotor having an electromagnetic coil and rotatable about a same rotational axis as said worm wheel;
an armature that is mounted to said worm wheel and is pulled into contact with said rotor upon application of electric power to said electromagnetic coil, so that said armature is rotated with said rotor; and
a cover member configured to cover said rotor and said armature;
a power supply mechanism disposed between said cover member and said rotor and connected to a power source for supplying power to said electromagnetic coil;
wherein said power supply mechanism includes:
a fixed frame body having a first power supply portion for receiving the power from said power source and fixed to said cover member;
a rotary frame body having a second power supply portion in contact with said first power supply portion for supplying the power to said electromagnetic coil, said rotary frame body being fixed to said rotor and engaged with said fixed frame body rotatably relative to said fixed frame body; and
a plate-like conducting member provided in said cover member, said conducting member coming into contact with a portion of said first power supply portion projecting from said fixed frame body.

With the electromagnetic clutch having the above-described construction, between the cover member and the rotor, there are provided the fixed frame member having the first power supply portion for receiving electric power from the power source and the rotary frame body having the second power supply portion for supplying the electric power to the electromagnetic coil. And, when the fixed frame body is fixed to the cover member, the portion of the first power supply portion projecting from the fixed frame member comes into contact with the plate-like conducting member provided in the cover member. Therefore, this construction allows an electric circuit to be formed without use of any wiring members, such as the lead wire. As a result, the number of parts and the manufacturing steps for the electromagnetic clutch can be reduced, and the manufacture costs thereof too can be reduced.

Preferably, in the inventive electromagnetic clutch described above, said first power supply portion includes a pair of slip rings disposed concentrically about said rotational axis, and said second power supply portion has a pair of contacting portions for coming into contact with said pair of slip rings respectively. In particular, advantageously, said pair of contacting portions are disposed so as to come into contact with the pair of slip rings respectively at positions opposed to each other across said rotational axis.

With electromagnetic clutch having the above-described construction, said pair of contacting portions are provided at the positions opposed to each other across said rotational axis so as to contact the pair of springs. Hence, the posture of the rotary frame member relative to the fixed frame member can be maintained substantially horizontal. Therefore, in the course of the assembly of the electromagnetic clutch, the respective parts and components thereof can be assembled under proper postures.

Preferably, in the inventive electromagnetic clutch described above, in a face of said fixed frame body opposed to said rotary frame body, there are formed two annular recesses arranged concentrically about said rotational axis, slip ring stopping grooves formed continuously with said respective annular recesses;
one of said slip rings is inserted in one of the two annular recesses and the other of said slip rings is inserted in the other of said two annular recesses;
one of said slip rings forms a first pawl portion integrally with its inner periphery or outer periphery, and the other of said slip rings forms a second pawl portion integrally with its inner periphery or outer periphery, said first pawl portion being retained in one of said slip ring stopping grooves of said slip ring, said second pawl portion being retained in the other of said slip ring stopping grooves.

With the electromagnetic clutch having the above-described construction, there are provided annular recesses and slip ring stopping grooves, and the pawl portions formed integrally with the slip rings are retained to the slip ring stopping grooves. Therefore, the slip rings can be maintained at the appropriate positions. As a result, it is possible to reduce the number of components and to allow the assembly of the respective components under the appropriate postures in the course of assembly of the electromagnetic clutch.

Further, in the electromagnetic clutch according to the present invention, advantageously, said first pawl portion of said slip ring integrally includes a first terminal portion for coming into contact with said plate-like conducting member and said second pawl portion of said slip ring integrally includes a second terminal portion for coming into contact with said plate-like conducting member. With this, further reduction in the number of components is made possible.

Further, in the electromagnetic clutch according to the present invention, advantageously, said second power supply portion includes a fixed portion to be fixed to said fixed frame body, a contacting portion continuously with said fixed portion and coming into contact with said slip ring, and a terminal portion continuous from said fixed portion and projecting from said fixed portion through said fixed frame body along the direction of said rotational axis to be electrically connected to said electromagnetic coil. With this, further reduction in the number of components is made possible.

Further, in the electromagnetic clutch according to the present invention, advantageously, said contacting portion is formed of elastic material, so that said contacting portion is pressed against said slip ring through elastic deformation of said contacting portion. With this, it is possible to establish the contact between the contacting portion and the slip ring without inviting increase in the number of components.

Further, in the electromagnetic clutch according to the present invention, advantageously, said armature includes a plate spring member and said worm wheel and said plate spring member are engaged with each other so that armature is retained to said worm wheel, with said armature being urged toward said worm wheel.

With the above construction, for retaining the armature to the worm wheel, the spring plate member attached to the armature and the worm wheel are engaged with each other, without using such fixing members as caulking pins, screws, etc. Therefore, the number of components constituting the electromagnetic clutch can be reduced and as a result, the manufacture costs thereof can be reduced.

Further, in the electromagnetic clutch according to the present invention, advantageously, said plate spring member includes an engaging pawl and said worm wheel includes an engaging hole, so that with engagement of said engaging pawl and said engaging hole, said armature is retained to said worm wheel, with said armature being elastically urged thereto.

With the electromagnetic clutch having the above construction, the engagement between the engaging pawl formed on the plate spring member and the engaging hole formed in the worm wheel can be done manually, without requiring any special tool or the like. So, the electromagnetic clutch can be assembled relatively easily.

Further, once the above engagement established, the armature is elastically urged against and retained to the worm wheel side by the plate spring member. Therefore, under the non-powered state with no power supply to the electromagnetic coil, the armature can be detached from the rotor in a reliable manner. For this reason, when the vehicle door is manually opened/closed, the noise due to the friction between the armature and the rotor will not be generated and this manual operation can be done with a small force. Further, as the armature is pulled toward the worm wheel side by the plate spring member, contact noise due to vibration or the like will not be generated, either.

Further, in the electromagnetic clutch according to the present invention, advantageously, said plate spring member includes a contacting portion configured to exert an elastic force along the rotational direction of said worm wheel and a contacted portion where said worm wheel engages said contacting portion inwardly.

With the electromagnetic clutch having the above-described construction, as the contacting portion provided in the plate spring member bears a portion of the rotational torque of the worm wheel, the transmission of drive force from the worm wheel side to the armature side is improved.

Also, as this contacting portion can absorb shock in the rotational direction of the worm wheel, it is possible to reliably restrict generation of the contact noise due to vibration, hitting noise at the time of driving/stopping, etc.

Further, in the electromagnetic clutch according to the present invention, advantageously, a rotation restricting member for restricting the rotation of said worm wheel relative to said armature to a predetermined angle is provided between said armature and said worm wheel.

When the motor rotates the worm wheel, this causes elastic contact in the rotational direction between the contacted portion of the worm wheel and the contacting portion of the plate spring member and then the rotational drive force is transmitted to the armature. In this, if the worm wheel is rotated excessively relative to the armature, this may lead to plastic deformation in the plate spring member, exceeding its elastically deformable range.

Then, in the case of the electromagnetic clutch of the above construction, there is provided the rotation restricting member between the armature and the worm wheel. With this, if the worm wheel is to be rotated excessively relative to the armature, the relative rotation of the worm wheel is restricted to the predetermined angle, so that such plastic deformation of the plate spring member can be avoided advantageously.

Further, since the worm wheel and the armature can contact each other in a reliable manner via the rotation restricting member, once the contact therebetween established, no delay in the transmission speed of the rotational force will occur thereafter. That is, the delay in the initial transmission speed can be minimized.

Further, in the electromagnetic clutch according to the present invention, advantageously, an outer diameter of said plate spring member is set greater than an outer diameter of said armature, and in the perimeter of said plate spring member, there is formed a flange portion bent toward said armature side.

With the electromagnetic clutch having the above construction, one face and lateral face of the armature are covered with the plate spring member. So, there will occur no inadvertent adhesion of grease applied to the worm wheel to the armature. Therefore, the frictional surface of the electromagnetic clutch can be effectively protected and the transmission of the rotational drive to the vehicle door side can proceed in a reliable manner.

BRIEF DESCRIPTION OF THE DRAWINGS

FIG. 1 is a plane view of a vehicle door opening/closing apparatus implementing an electromagnetic clutch according to the present invention, FIG. 2 is a side view of the vehicle door opening/closing apparatus, FIG. 3 is a side view in section showing principal portions of the vehicle door opening/closing apparatus, FIG. 4 is a side view in section showing principal portions of the vehicle door opening/closing apparatus, FIG. 5 is an exploded view showing a mode of mounting an armature to a worm wheel, FIG. 6 is an enlarged section view showing a mounting portion of the armature to the worm wheel, FIG. 7 is an exploded perspective view of the electromagnetic clutch, FIG. 8 is an exploded view of a power supply unit, FIG. 9 is a plane view showing the inside of the power supply unit, and FIG. 10 is a perspective view showing a fixed condition of the power supply unit to a power supply unit cover member.

BEST MODE OF EMBODYING THE INVENTION

Next, an embodiment of the present invention will be described with reference to the accompanying drawings. Incidentally, it is understood that the present invention is not limited to the embodiment described below and constructions and arrangements equivalent thereto are intended to be encompassed within the scope of the invention.

FIG. 1 is a plane view of a vehicle door opening/closing apparatus implementing an electromagnetic clutch according to the present invention. FIG. 2 is a side view of the vehicle door opening/closing apparatus, and FIGS. 3 and 4 are side views in section showing principal portions of the vehicle door opening/closing apparatus.

[General Construction of Vehicle Door Opening/Closing Apparatus]

As shown in FIGS. 1-4, the vehicle door opening/closing apparatus A implementing the electromagnetic clutch 1 according to the present invention includes an electric motor M as a drive source for the vehicle door, the motor M being disposed inside a cover member 9 consisting essentially of a gear side cover member 91 and a power supply unit side cover member 92. The apparatus A further includes a worm gear 103 directly coupled to the electric motor M, a worm wheel 2 meshed with the worm gear 103, an armature 3 rotatable in unison with the worm wheel 2, a rotor 4 incorporating an electromagnetic coil 5 constituting an electromagnetic clutch 1 together with the armature 3, a clutch shaft 100 for transmitting rotational force of the rotor 4, a power supply unit S (an example of a "power supply mechanism" in this invention) for supplying power to the electromagnetic coil 5, and a control unit E for controlling the power supply unit S so as to engage/disengage the electromagnetic clutch 1.

[Construction of Electromagnetic Clutch]

First, the construction of the electromagnetic clutch 1 will be explained. FIG. 5 is an exploded view showing a mode of mounting the armature 3 to the worm wheel 2. FIG. 6 is an enlarged section view showing a mounting portion of the armature 3 to the worm wheel 2. FIG. 7 is an exploded perspective view of the electromagnetic clutch 1.

The armature 3 is formed of such a material as iron, capable of being attracted by a magnet. The rotor 4 is formed of a magnetic material so as to generate a force of attraction by the magnetism to the armature 3 upon supply of power to the electromagnetic coil 5. The rotor 4 is rotatable about the same rotational axis as the worm wheel 2. The armature 3 and the rotor 4 are accommodated in the power supply unit side cover member 92.

As shown in FIG. 7, the rotor 4 forms an annular recess 41 configured to accommodate a bobbin 50 with the electromagnetic coil 5 wound thereabout, the annular recess being formed along the vicinity of the outer periphery of its face opposed to the armature 3. This recess 41 has an inner peripheral wall portion 42 formed with an inclination such that the inner diameter of the inner peripheral wall portion 42 of the recess 41 becomes smaller from the bottom to the upper side. On the other hand, an outer peripheral wall portion 43 of the recess 41 is formed substantially perpendicular. Therefore, from the bottom to the upper side, the width of the recess 41 becomes greater.

In this rotor 4, the area of an end face 43a of the outer peripheral wall portion 43 opposed to the armature 3 and the area of an end face 42a of the inner peripheral wall portion 42 opposed to the armature 3 are set equal to each other, so that the area of magnetic field passage may be same on the side of the outer peripheral wall portion 43 and on the side of the inner peripheral wall portion 42. That is to say, the width normal to the peripheral direction of the end face 42a is set greater than the width normal to the peripheral direction of the end face 43a.

Further, with this type of electromagnetic clutch 1, in order to maintain the rotational torque constant, it is necessary to maintain constant the contacting portions between the armature 3 and the rotor 4. On the other hand, if the entire rotor 4 were configured to contact the armature 3, this might result in irregularity in the rotational torque, due to possible differences in the contacting portions depending on the individual products, due to e.g. manufacturing error or tolerance.

Then, in the case of this rotor 4, an arrangement is made such that only a predetermined region in the vicinity of the outer periphery of the rotor 4 may contact the armature 3. Specifically, the outer peripheral wall portion 43 has a higher profile than the inner peripheral wall portion 42, so that when the armature 3 is pulled, only the end face 43a of the outer peripheral wall portion 43 comes into contact with the armature 3. With use of such arrangement, the contacting portions between the armature 3 and the rotor 4 can be maintained constant, thus maintaining the rotational torque constant.

Further, there is also a need for causing the armature 3 and the rotor 4 to contact uniformly in the peripheral direction. To this end, a polishing treatment is provided to the contacting portion of the rotor 4 to come into contact with the armature 3. In this, since the contacting portion to come into contact with the armature 3 is limited to the end face 43a, the portion requiring such polishing treatment can be reduced, so that the manufacture cost can be reduced.

The bobbin 50, as shown in FIG. 7, is formed of a resin material and has a circular annular shape, having flange portions formed erect at opposed terminal ends in its outer periphery, with a length of the electromagnetic coil 5 being wound between the two flange portions. In this embodiment, the bobbin 50 has a tapered shape as viewed in section perpendicular to the peripheral direction.

Further, the bobbin 50 includes also projecting portions 52 to be fixed to the rotor 4 and terminal portions 53 for supplying power to the electromagnetic coil 5. As shown in FIG. 7, this bobbin 50 with the electromagnetic coil 5 wound thereabout is housed within the recess 41 of the rotor 4. In this housed condition, the projecting portions 52 of the bobbin 50 are inserted into holes 44a defined in the bottom of the recess 41 and the terminal portions 53 are inserted into holes 44b defined in the bottom of the recess 41, whereby the electromagnetic coil 5 is fixed to the rotor 4 to be rotatable therewith.

The projecting portions 52 and the terminal portions 53 extend through the holes 44a, 44b to project from the back face of the rotor 4.

[Operations of Electromagnetic Clutch]

Next, operations of the electromagnetic clutch 1 will be explained with reference to FIGS. 3 and 4.

FIG. 3 shows a case when the electromagnetic clutch 1 is under its disengaged state. At the non-powered state with no power supply from the power supply unit S to the electromagnetic coil 5, the armature 3 is elastically urged (elastically retained or supported) to the worm wheel 2 side by the plate spring member 10. Therefore, there is formed a gap between the armature 3 and the rotor 4, so that the electromagnetic clutch 1 assumes the disengaged state. Under this disengaged state, since the unillustrated vehicle door is not directly coupled to the electric motor M, its opening/closing operation can be done manually with a small force. Further, there occurs no generation of noise due to friction between the armature 3 and the rotor 4. Moreover, as the armature 3 is pulled toward the worm wheel 2 side by the plate spring member 10, there will occur no generation of contact noise due to vibration (so-called clattery noise), either.

FIG. 4 shows a case when the electromagnetic clutch is under its engaged state. At the time of power supply from the power supply unit S to the electromagnetic coil 5, a magnetic force is generated from the electromagnetic coil 5, which strongly pulls the armature 3 to the rotor 4. With this, the gap between the armature 3 and the rotor 4 is eliminated, whereby the electromagnetic clutch 1 enters the engaged state. Under this engaged state, when the electric motor M is driven, this drive force is transmitted to the worm gear 103, the worm wheel 2, the plate spring member 10, the armature 3, the rotor 4 and a clutch shaft 100, in the mentioned order, and this force eventually reaches the opening/closing mechanism of the unillustrated vehicle door, so that an opening/closing operation of the vehicle door is effected.

[Mounting Construction of Armature to Worm Wheel]

The electromagnetic clutch 1 according to the present invention achieves "reduction in the number of parts" and "readiness of assembly" through improvement and inventive arrangement in the mounting condition of the armature 3 relative to the worm wheel 2.

As shown in FIG. 5 and FIG. 6, the armature 3 is mounted to the worm wheel 2 via the plate spring member 10. The armature 3 and the plate spring member 10 are fixed to each other with a caulking pin 40. The worm wheel 2 defines a plurality of engaging holes 21 (three through holes in the case of the embodiment shown in FIG. 5). Whereas, the plate spring member 10 to be fixed to the armature 3 includes a plurality of engaging pawls 11 (three key-like projections in the case of the embodiment shown in FIG. 5) at positions corresponding to the plurality of engaging portions 21. Here, the engaging pawls 11 of the plate spring member 10 side are inserted and engaged into the engaging holes 21 of the worm wheel 2 side. With this, the armature 3 is mounted under a suspended condition, to the worm wheel 2. Further, under this condition, the armature 3 is elastically urged and retained to the worm wheel 2 side by the plate spring member 10. Therefore, the armature 3 is reliably detached from the rotor 4. Further, upon establishment of the engagement between the engaging pawls 11 and the engaging holes 21, the rotational force is transmitted from the worm wheel 2 side to the armature 3 side.

As described above, with the electromagnetic clutch 1 of the present invention, the fixing of the armature 3 to the worm wheel 2 is done through the above-described engagement between the engaging pawls 11 and the engaging holes 21. Therefore, there is no need to prepare any special fixing members. Accordingly, in comparison with the conventional electromagnetic clutch with which the fixing between the worm wheel 2 and the armature 3 would be done by means of caulking pins, screw fastening, etc., it is possible to reduce the number of parts constituting the clutch. As a result, its manufacture costs can be reduced. Further, because the above-described engagement can be done by a manual operation, not requiring any special tool or the like, the assembly of the clutch can be done relatively easily.

Further, the inventive electromagnetic clutch 1 has an ingenious arrangement for restricting contact noise due to vibration or the like. As shown in FIG. 5, the worm wheel 2 forms a plurality of contacted portions 22 (three angular recesses in the case of the embodiment shown in FIG. 5), whereas the plate spring member 10 forms a plurality of contacting portions 12 (three curved projection pairs in the case of the embodiment shown in FIG. 5) at positions corresponding to the plurality of contacted portions 22. Here, when the contacting portions 12 on the plate spring member 10 side are inserted into the contacted portions 22 on the worm wheel 2 side, as shown in FIG. 6, the respective curved projection pairs 12a, 12b come into elastic contact with the two wall faces 22a, 22b of the inner walls of the respective curved angular recesses opposed to each other in the rotational direction of the worm wheel 2.

With this mode of contact, the contacting portions 12 bear a portion of the rotational torques of the worm wheel 2. Therefore, the transmission of the drive force from the worm wheel 2 side to the armature 3 side can be improved. For instance, a response speed in response to an input of drive force will be improved. Further, the contacting portions 12 can absorb shock in the rotational direction of the worm wheel 2. As a result, it is possible to restrict reliably generation of contact noise due to vibration, a hitting hose at the time of driving/stopping.

[Transmission Construction of Rotational Drive Force by Rotation Restricting Member]

When the electric motor M rotates the worm wheel 2 via the worm gear 103, the contacted portions 22 of the worm wheel 2 and the contacting portions 12 of the plate spring member 10 come into elastic contact with each other and then, the rotational drive force is transmitted to the armature 3. However, if the worm wheel 2 is rotated excessively relative to the armature 3, this may result in plastic deformation of the plate spring member 10 exceeding its elastic deformation limit. For instance, if the contacting portion 12 of the plate spring member 10 is plastically deformed as being exposed to an excessive force, this will result in formation of a gap (play) between the worm wheel 2 and the armature 3 in the rotational direction, which gap may be a cause for noise generation. And, if plastic deformation occurs in the engaging pawl 11 of the plate spring member 10, this will change the mounting condition of the armature 3 relative to the worm wheel 2, which in turn may provide adverse influence to the engaging/disengaging operation of the electromagnetic clutch 1.

Then, in order to avoid such problems as above, in the case of the inventive electromagnetic clutch 1, a rotation restricting member can be provided between the armature 3 and the worm wheel 2. For instance, as shown in FIG. 5, concave/convex members 24 (an example of the "rotation restricting member" in the present invention) having different thicknesses in the radial direction are provided at the inserting portion for the clutch shaft 100 on the worm wheel 2 side. Whereas, the armature 3 forms cutout portions 31 capable of receiving therein the concave/convex members 24. The concave/convex shape of the concave/convex member 24 is set such that the concave/convex member 24 of the worm wheel 2 side comes into contact with the cutout portion 31 of the armature 3 before the worm wheel 2 is about to be rotated by an angle greater than the predetermined angle relative to the armature 3, that is, before plastic deformation occurs in the plate spring member 10 mounted to the armature 3 due to an excessive relative rotation of the worm wheel 2. With this, even if an excessive rotational drive force is inputted which would cause the worm wheel 2 to rotate by an angle exceeding a predetermined angle, the relative rotation of the worm wheel 2 is effectively restricted. As a result, the plastic deformation of the plate spring member 10 can be prevented. Further, in this case, the worm wheel 2 and the armature 3 are come into reliable contact with each other via the concave/convex members 24. Hence, once the contact therebetween established, there will occur no delay in the transmission speed of the rotational drive force thereafter. That is, the delay in the initial transmission speed can be restricted to the minimal.

Incidentally, when it is possible to cause the plate spring member 10 alone to bear the rotational drive force of the worm wheel 2 by increasing the thickness of the plate spring member 10 to a value beyond a predetermined value, such rotation restricting member need not be provided.

[Construction for Preventing Soiling of Electromagnetic Clutch]

Normally, an amount of grease is applied to the worm wheel 2 for lubrication. However, if this grease becomes adhered to the armature 3, the grease will be adhered to the friction face of the rotor 4 when the armature 3 and the rotor 4 become connected to each other, which adhesion may provide adverse influence to the transmission of the rotational drive force.

In view of the above, in the case of the inventive electromagnetic clutch 1, as shown in FIG. 5, the outer diameter of the plate spring member 10 to be mounted to the armature 3 is formed greater than the outer diameter of this armature 3, thus forming, along the perimeter of the plate spring member 10, a flange portion 13 bent toward the armature 3 side. With this, the one face and the lateral face of the armature 3 are covered with the plate spring member 10. Hence, the grease applied to the worm wheel 2 is effectively prevented from adhering to the armature 3. Therefore, the friction face of the rotor 4 constituting the electromagnetic clutch 1 is protected and the transmission of the rotational drive force to the vehicle door side can be effected in a reliable manner.

[Construction and Arrangement of Power Supply Unit]

The electromagnetic clutch 1 according to the present invention achieves "reduction in the number of parts" and "readiness of assembly" through improvement and inventive arrangement in the construction and arrangement of the power supply unit.

FIG. 8 is an exploded view of the power supply unit S. FIG. 9 is a plane view showing the inside of the power supply unit S. FIG. 10 is a perspective view showing a fixing condition of the power supply unit S to the power supply unit side cover member 92.

The power supply unit S includes a slip ring fixing member 8 having a pair of slip rings 87, 88, as a "first power supply portion" electrically connected to the power source P via a control unit E (see FIG. 1), and a brush fixing member 7 having a pair of brush members 76, as a "second power supply portion" electrically connected to the electromagnetic coil 5. When the slip rings 87, 88 are caused to contact with the brush members 76, power supply to the electromagnetic coil 5 is effected. That is to say, in association with rotation of the electromagnetic coil 5 (rotor 4), the brush members 76 are caused to slide over the slip rings 87, 88, whereby electric power is supplied to the electromagnetic coil 5, regardless of the angular phase of the electromagnetic coil 5 (rotor 4).

As shown in FIG. 8, in addition to the slip rings 87, 88 and the brush members 76 described above, the power supply unit S further includes a "fixed frame body" to be fixed to the power supply unit side cover member 92 and a "rotary frame body" rotatable in unison with the rotor 4. In this respect, the fixed frame body comprises the slip ring fixing member 8 fixing the slip rings 87, 88 and the rotary frame body comprises the brush fixing member 7 fixing the brush members 76. The slip ring fixing member 8 and the brush fixing member 7 are rotatable relative to each other, with the slip rings 87, 88 being opposed to the brush members 76 and these members 8, 7 are integrated into a unit with prevention of axial withdrawal relative to each other.

In the face of the slip ring fixing member 8 opposed to the brush fixing member 7, there are formed two annular recesses 83, 84 arranged concentrically about the same rotational axis as the worm wheel 2, and on the sides of the respective recesses 83, 84, arcuate slits 83b, 84b are formed. In this particular embodiment, the slit 83b is formed on the inner peripheral side of the small-diameter recess 83 and the slit 84b is formed on the outer peripheral side of the large-diameter recess 84. These slits 83b, 84b are communicated with openings 83a, 84a opened in the faces opposed to the brush fixing member 7 and communicated also with the back side of the opposing face. With this, the opening 83a and the slit 83b in combination and the opening 84a and the slit 84b in combination constitutes a "slip ring stopping groove", respectively. Further, on the side of the opposing face, an inner peripheral wall portion 81 is formed along the inner periphery of the slip ring fixing member 8 and an outer peripheral wall portion 82 is formed along the outer periphery of the same. And, on the outer peripheral face of the inner peripheral wall portion 81 and the inner peripheral face of the outer peripheral wall portion 82, there are formed a plurality of arcuate-shaped, anti-withdrawal projections 81a, 82a along the peripheral direction for preventing inadvertent withdrawal relative to the brush fixing member 7. On the other hand, on the side of the back face of the opposing face, there are formed engaging portions 86 to be engaged with holes 92a formed in the power supply unit side cover member 92, and a phase fixing projection 85 to be inserted into a hole 92e defined in the power supply unit side cover member 92 thereby to fix the phase in the rotational direction of the power supply unit S.

In the face of the brush fixing member 7 opposed to the slip ring fixing member 8, there is formed a fixing portion 74 for the attachment of the brush member 76. This fixing portion 74 includes a slit 74a extending radially of the brush fixing member 7 and a slit 74b extending along the peripheral direction in the vicinity of the radial inner end of the slit 74a. Further, this fixing portion 74 includes a projection 74d extending along the peripheral direction in the vicinity of the radial outer end of the slit 74a and a projection 74c extending along the peripheral direction in opposition to the slit 74a. Further, adjacent the fixing portion 74, there are formed holes 75 into which terminal portions 76b of the brush member 76 to be described later are inserted. And, the fixing portion 74 and the holes 75 are formed in correspondence with each brush member 76.

Further, the brush fixing member 7 forms an inner peripheral wall portion 72 and an outer peripheral wall portion 73, and on the inner peripheral side of the inner peripheral wall portion 72 and on the outer peripheral side of the outer peripheral wall portion 73, there are formed annular anti-withdrawal projections 72a, 73a for preventing inadvertent withdrawal in the axial direction between the brush fixing member 7 and the slip ring fixing member 8.

Further, as shown in FIG. 10, in the back side of the opposing face of the brush fixing member 7, there is formed a concave rotor holding portion 71 for holding the rotor 4 to be rotatable therewith.

The brush member 76 is formed of an elastic material having conductive property and includes a brush portion 76a (an example of "contacting portion" in the present invention) for coming into contact with the slip ring 87, 88, the terminal end portion 76b for coming into contact with the terminal portion 53 formed in the coil bobbin 50, and a fixed portion 76c to be attached to the brush fixing member 7.

Further, this power supply unit S includes the two slip rings as slip rings, i.e. the small slip ring 87 and the large slip ring 88. These two slip rings 87 and 88 are disposed concentrically, with one of them being connected to one terminal of the power source, the other thereof being connected to the other terminal of the power source. These slip rings 87, 88 are formed of an elastic material having conductivity and include annular portions for coming into slidable contact with the brush member 76 and pawl portions 87a, 88a projecting radially from the annular portions. A plurality of such pawl portions 87a, 88a (three of them are provided in the case of the present embodiment) are provided along the peripheral direction, and in one of the pawl portions 87a, 88a, a terminal portion 87b, 88b is formed by bending the leading end of this pawl portion 87a, 88a. These terminal portions 87b, 88b are electrically connected to the power source via a plate-like conducting member 92 to be described later. Further, in the instant embodiment, the large slip ring 88 forms the pawl portion 88a on its outer radial side and the small slip ring 87 forms the pawl portion 87b on the inner radial side.

[Arrangement of Power Supply Unit]

The power supply unit S, as shown in FIG. 3 and FIG. 4, is disposed between the rotor 4 and the power supply unit side cover member 92. Specifically, first, the slip ring fixing member 8 is engaged and fixed to the power supply unit side cover member 92 and then, the brush fixing member 7 is engaged to the slip ring fixing member 8 to be rotatable relative thereto. Further, the rotor 4 is mounted to the brush fixing member 7. With this, electrical connection is established among and between the plate-like conducting member 92c provided in the power supply unit side cover member 92, the slip rings 87, 88, the brush member 76, and the terminal portion 53 for supplying power to the electromagnetic coil 5 provided in the rotor 4.

With use of such arrangement as described above, the electromagnetic clutch 1 according to the present invention allows formation of an electric circuit without using wiring material or components such as the lead wires which were needed in the conventional power supply unit. As a result, it has become possible to reduce the number of components or parts constituting the electromagnetic clutch and reduce its manufacture costs. This will be described in greater details below.

First, mounting operations of the slip rings 87, 88 to the slip ring fixing member 8 will be described. As shown in FIG. 8, the pawl portions 87a, 88a of the slip rings 87, 88 are inserted from above into the openings 83a, 84a. Then, the slip rings 87, 88 are rotated, thereby to allow the pawl portions 87a, 88a to be inserted into the slits 83b, 84b. With this, the terminal portions 87b, 88b formed by bending the pawl portions 87a, 88a are caused to project from the slits to the back face side.

Incidentally, the slip rings 87, 88 may be fixed to the slip ring fixing member 8 by the insert molding technique.

Next, mounting of the brush member 76 to the brush fixing member 7 will be explained. As shown in FIG. 8, as the fixed portion 76c is caused to slide along the slit 74a and the projection 74c from the radially outer side to the radially inner side, thereby to engage the radially inner end portion of the fixed portion 76c with the slit 74b. Further, with elastic deformation of the fixed portion 76c, the projection 74d is caused to ride over the radially outer end portion of the fixed portion 76c, thereby to establish contact between the end face of the fixed portion 76c and the end face of the projection 74d. With this, the slit 74a and the projection 74d function to restrict movement of the fixed portion 76c in the peripheral direction and the slit 74a and the projection 74d function to restrict movement of the fixed portion 76c in the radial direction and the brush member 76 is mounted to the brush fixing member 7. Under this condition, as shown in FIG. 10, the terminal portion 76b is inserted into the hole 75 to project on the side of the rotor holding portion 71.

Incidentally, the brush member 76 may be fixed to the brush fixing member 7 by the insert molding technique.

The slip ring fixing member 8 and the brush fixing member 7 are assembled into a unit by the "snap-fit" arrangement. As shown in FIG. 8, as the brush fixing member 7 is inserted into the gap between the inner peripheral wall portion 81 and the outer peripheral wall portion 82 of the slip ring fixing member 8, the brush fixing member 7 and the slip ring fixing member 8 are assembled into a unit. Here, the gap between the anti-withdrawal projection 72a and the anti-withdrawal projection 73a of the brush fixing member 7 is set to be slightly greater than the gap between the anti-withdrawal projection 81a and the anti-withdrawal projection 82a of the slip ring fixing member 8. With the elastic deformation of the resin material, the anti-withdrawal projection 72a and the anti-withdrawal projection 81a, and anti-withdrawal projection 73a and the anti-withdrawal projection 82a, are caused to ride over each other. With this, the brush fixing member 7 and the slip ring fixing member 8 are combined into a unit, with the brush portion 76a of the brush member 76 being placed in contact with the slip rings 87, 88. Upon establishment of the above engagement between the slip ring fixing member 8 and the brush fixing member 7, in the rotational axis direction of the rotor 4, relative movement therebetween is restricted. On the other hand, in the rotational direction of the rotor 4, the brush fixing member 7 is rotatable relative to the slip ring fixing member 8, so power can be supplied reliably to the electromagnetic coil 5 during an opening/closing operation of the vehicle door, as well.

Incidentally, in order to ensure the protection of the power supply circuit, in the course of the engagement between the brush fixing member 7 and the spring fixing member 8, the sealing therebetween can be enhanced. For instance, this is possible by providing an amount of sealing material or applying an amount of grease for sealing along the engaging portion therebetween.

The power supply unit S provided as a unit as described above is assembled with the electromagnetic clutch 1. As shown in FIG. 10, the slip ring fixing member 8 of the power supply unit S is attached to the inside of the power unit side cover member 92. Inside the power supply unit cover member 92, groove portions 92b are formed, and into these groove portions 92b, the plate-like conducting member 92c extending from the outer terminal portion 92d of the power supply unit side cover member 92 is provided. Alternatively, this conducting member 92c may be fixed to the power supply unit side cover member 92 by the insert molding technique.

As the engaging portions 86 formed in the slip ring fixing member 8 are engaged into the holes 92a formed in the power supply unit side cover member 92, the slip ring fixing member 8 is fixed. In this, as the phase fixing projection 85 formed on the slip ring fixing member 8 is inserted into the hole 92e defined in the power supply unit side cover member 92, the angular phase of the conducting member 92c and the angular phase of the terminal portions 87b, 88b of the slip rings 87, 88 are brought into agreement to each other. With this, the conducting member 92c and the slip rings 87, 88 are placed in contact with each other, thus being electrically connected to each other. In this way, simultaneously with the fixing of the slip ring fixing member 8 to the power supply unit side cover member 92, the terminal portions 87b, 88b of the slip rings 87, 88 are brought into contact with the conducting member 92c provided in the power supply unit side cover member 92.

Further, the rotor 4 is fixed to the rotor holding portion 71 on the side of the brush fixing member 7 of the power supply unit S. In this, the projections 52a projecting from the rotor 4 are inserted into the holes 71a, whereby the brush fixing member 7 and the rotor 4 are fixed to each other to be rotatable in unison. Further, as the terminal portions 53 projecting from the rotor 4 are inserted into the holes 75, the terminal portions 53 and the terminal portions 76b of the brush member 76 are electrically connected to each other.

Of the power supply unit S, the slip ring fixing member 8 is fixed to the power supply unit side cover member 92 and the brush fixing member 7 is rotatable together with the rotor 4. With this, during rotation of the rotor 4, the brush member 76 slides over the slip rings 87, 88 and power is supplied to the electromagnetic coil 5.

As described above, the slip ring fixing member 8 and the brush fixing member 7 are movable relative to each other within a predetermined range along the axial direction. Therefore, with such relative movement, an error or tolerance, if any, in the assembly of the entire apparatus is absorbed. On the other hand, as the brush member 76 is formed of an elastic material, when this is pressed against the slip rings 87, 88, the brush member urges the slip ring fixing member 8 and the brush fixing member 7 in directions away from each other. As a result, looseness in the axial direction can be prevented.

Further, under the condition of the slip ring fixing member 8 and the brush fixing member 7 being engaged with each other, the slip rings 87, 88 and the brush member 76 that constitute the power supply circuit are housed reliably inside the power supply unit S, thus being isolated from the worm wheel 2. Therefore, grease or the like applied to the worm wheel 2 will not adhere to the power supply circuit housed inside the power supply unit S. As a result, electric conduction failure or trouble such as short circuiting of the electric circuit can be avoided, so that stable and reliable vehicle door opening/closing operations can be realized.

Moreover, for manufacturing the electromagnetic clutch 1, this is possible simply by engaging and superposing the respective constituent components one on another. Therefore, no special tool or the like is required and such operation as a soldering operation is not needed, either. Hence, the assembly of the clutch can be readily done manually.

With the inventive electromagnetic clutch 1 having the above-described construction, the number of components has been reduced, and as a result, the product can be formed compact.

[Arrangements of Slip Rings and Brush Members]

With the electromagnetic clutch 1 according to the present invention, through ingenious arrangements of the slip rings 87, 88 and the brush member 76, the compact formation and stable power supply of the electromagnetic clutch 1 are realized.

FIG. 9 is a plane view showing the inside of the power supply unit S. As shown in this figure, the slip rings 87, 88 provided in the slip ring fixing member 8 are disposed concentrically about the clutch shaft 100 extending at the center of the rotor 4. The brush members 76 provided in the brush fixing member 7 are disposed so as to come into contact with the slip rings 87, 88 respectively at positions opposed to each other across the center (rotational axis) of the rotor 4. Further, while the brush fixing member 7 and the slip ring fixing member 8 are rotatable relative to each other, movement of these members in the axial direction is restricted. With such arrangement, the brush fixing member 7 is lifted from the slip ring fixing member 8 due to the urging force (elasticity) of the brushes. However, as withdrawal or detachment there is effectively prevented by the anti-withdrawal projections 72a, 73a and the anti-withdrawal projections 81a, 82a, the brush fixing member 7 can be maintained under the parallel posture relative to the slip ring fixing member 8 with no inclination relative thereto. Therefore, in the course of the assembly of the electromagnetic clutch 1, this assembly can be done with keeping the respective components under the appropriate postures, and the power supply unit S can be formed compact, which in turn contributes to compact formation of the electromagnetic clutch 1 as a whole.

Incidentally, the arrangement of the brush members 76 relative to the slip rings 87, 88 is not limited to the exactly opposing arrangement across the center (rotational axis) of the rotor 4. Some displacement or error is permissible as long as the brush fixing member 7 as a whole is lifted by the brush members 76.

Further, the elasticity of the brush members 7 is set to such a degree that it can absorb a certain amount of error, if any, occurred in the height position of the rotor 4 due to difference in the individual electromagnetic clutch, thereby to allow the contact thereof with the slip rings 87, 88.

[Further Embodiments]

(1) In the foregoing embodiment, the power supply unit S is disposed between the power supply unit side cover member 92 and the rotor 4. Instead, this unit S may be disposed between the gear side cover member 91 and the rotor 4. In this case, the conducting member 92c provided in the power supply unit side cover member 92 will be provided in the gear side cover member 91, instead.

(2) In the foregoing embodiment, in the power supply unit S, the slip ring fixing member 8 is fixed to the power supply unit side cover member 92 and the brush fixing member 7 is rotatable in unison with the rotor 4. Instead, the brush fixing member 7 may be fixed to the power supply unit side cover member 92 and the slip ring fixing member 8 may be assembled with the rotor 4.

(3) In the foregoing embodiment, the engaging pawls 11 are formed in the plate spring member 10 and the engaging holes 21 are formed in the worm wheel 2. Conversely, the engaging holes may be formed in the plate spring member 10 and the engaging pawls may be formed in the worm wheel 2. In this case, the plate spring member 10 will be formed with an appropriate thickness, and recesses for allowing projection of the engaging pawls will be formed in the surface portion of the armature 3 at positions corresponding to the engaging holes of the plate spring member 10.

(4) In the foregoing embodiment, as the rotation restricting member, there is provided the concave/convex member 41 provided in the clutch shaft inserting portion of the worm wheel 2 and having different thicknesses in the radial direction. However, the shape and disposing position of the rotation restricting member are not particularly limited, as long as the member can still restrict excessive relative rotation of the worm wheel 2 relative to the armature 3. For instance, a projecting portion may be provided adjacent the outer periphery of the worm wheel 2 and a hole for receiving this projecting portion may be provided in the armature 3 side.

(5) In the foregoing embodiment, the engaging pawls 11 and the contacting portions 12 that are formed in the plate spring member 10 and the engaging holes 21 and the contacted portions 22 that are formed in the worm wheel 2 are all provided three, respectively. Instead, two or four or more of them may be provided, respectively. Furthermore, the number of the set of the engaging pawls 11 and the engaging holes 21 may be different from the number of sets of the contacting portions 12 and the contacted portions 22.

(6) In the foregoing embodiment, in the power supply unit S, the slip ring fixing member 8 is fixed to the power supply unit side cover member 92 and the brush fixing member 7 is rotatable relative to the rotor 4. Alternatively and in reverse to the above, the brush fixing member 7 may be fixed to the power supply unit side cover member 92 and the slip ring fixing member 8 may be assembled with the rotor 4.

Industrial Applicability

The present invention is applicable to an electromagnetic clutch including, inside a cover member, a worm wheel rotatably driven by a motor, a rotor having an electromagnetic coil and rotatable about a same rotational axis, and an armature that is mounted to the worm wheel side and is pulled into contact with the rotor upon application of electric power to the electromagnetic coil, so that the armature is rotated with the rotor.

The invention claimed is:

1. An electromagnetic clutch comprising:
    a motor;
    a worm wheel rotatably driven by a motor;
    a rotor having an electromagnetic coil and rotatable about a same rotational axis as said worm wheel;
    an armature that is mounted to said worm wheel and is pulled into contact with said rotor upon application of electric power to said electromagnetic coil, so that said armature is rotated with said rotor; and
    a cover member configured to cover said rotor and said armature;
    a power supply mechanism disposed between said cover member and said rotor and connected to a power source for supplying power to said electromagnetic coil;
    wherein said power supply mechanism includes:
        a fixed frame body having a first power supply portion for receiving the power from said power source and fixed to said cover member;
        a rotary frame body having a second power supply portion in contact with said first power supply portion for supplying the power to said electromagnetic coil, said rotary frame body being fixed to said rotor and engaged with said fixed frame body rotatably relative to said fixed frame body; and
        a plate-like conducting member provided in said cover member, said conducting member coming into contact with a portion of said first power supply portion projecting from said fixed frame body.

2. The electromagnetic clutch according to claim 1, wherein said first power supply portion includes a pair of slip rings disposed concentrically about said rotational axis, and
    said second power supply portion has a pair of contacting portions for coming into contact with said pair of slip rings respectively.

3. The electromagnetic clutch according to claim 2, wherein said pair of contacting portions are disposed so as to come into contact with said pair of slip rings respectively at positions opposed to each other across said rotational axis.

4. The electromagnetic clutch according to claim 3, wherein in a face of said fixed frame body opposed to said rotary frame body, there are formed two annular recesses arranged concentrically about said rotational axis, slip ring stopping grooves formed continuously with said respective annular recesses;
    one of said slip rings is inserted in one of said two annular recesses and the other of said slip rings is inserted in the other of said two annular recesses; and
    one of said slip rings forms a first pawl portion integrally with its inner periphery or outer periphery, and the other of said slip rings forms a second pawl portion integrally with its inner periphery or outer periphery, said first pawl portion being retained in one of said slip ring stopping grooves of said slip ring, said second pawl portion being retained in the other of said slip ring stopping grooves.

5. The electromagnetic clutch according to claim 4, wherein said first pawl portion of said slip ring integrally includes a first terminal portion for coming into contact with said plate-like conducting member, and
    said second pawl portion of said slip ring integrally includes a second terminal portion for coming into contact with said plate-like conducting member.

6. The electromagnetic clutch according to claim 3, wherein said second power supply portion includes:
    a fixed portion to be fixed to said fixed frame body,
    a contacting portion continuously with said fixed portion and coming into contact with said slip ring, and
    a terminal portion continuous from said fixed portion and projecting from said fixed portion through said fixed frame body along the direction of said rotational axis to be electrically connected to said electromagnetic coil.

7. The electromagnetic clutch according to claim 3, wherein said contacting portion is formed of elastic material, so that said contacting portion is pressed against said slip rings through elastic deformation of said contacting portion.

8. The electromagnetic clutch according to claim 1, wherein said armature includes a plate spring member; and
    said worm wheel and said plate spring member are engaged with each other so that said armature is retained to said worm wheel, with said armature being urged toward said worm wheel.

9. The electromagnetic clutch according to claim 8, wherein said plate spring member includes an engaging pawl; and
    said worm wheel includes an engaging hole, so that with engagement of said engaging pawl and said engaging hole, said armature is retained to said worm wheel, with said armature being elastically urged thereto.

10. The electromagnetic clutch according to claim 8, wherein said plate spring member includes a contacting portion configured to exert an elastic force along the rotational direction of said worm wheel and a contacted portion where said worm wheel engages said contacting portion inwardly.

11. The electromagnetic clutch according to claim 8, wherein a rotation restricting member for restricting the rotation of said worm wheel relative to said armature to a predetermined angle is provided between said armature and said worm wheel.

12. The electromagnetic clutch according to claim 8, wherein an outer diameter of said plate spring member is set greater than an outer diameter of said armature, and in the perimeter of said plate spring member, there is formed a flange portion bent toward said armature side.

* * * * *